A. S. CAIRNCROSS.
ICING MACHINE.
APPLICATION FILED AUG. 7, 1920.
1,390,494.
Patented Sept. 13, 1921.
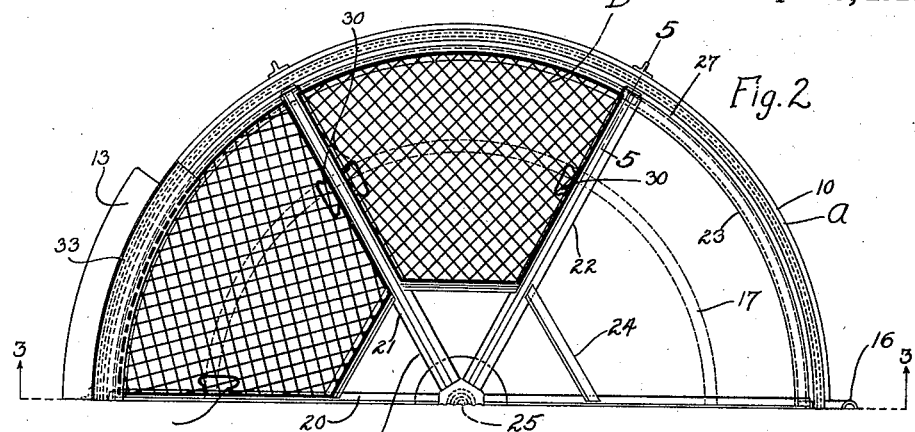
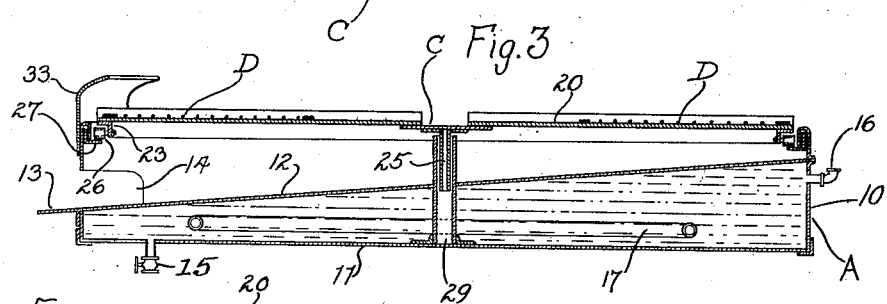
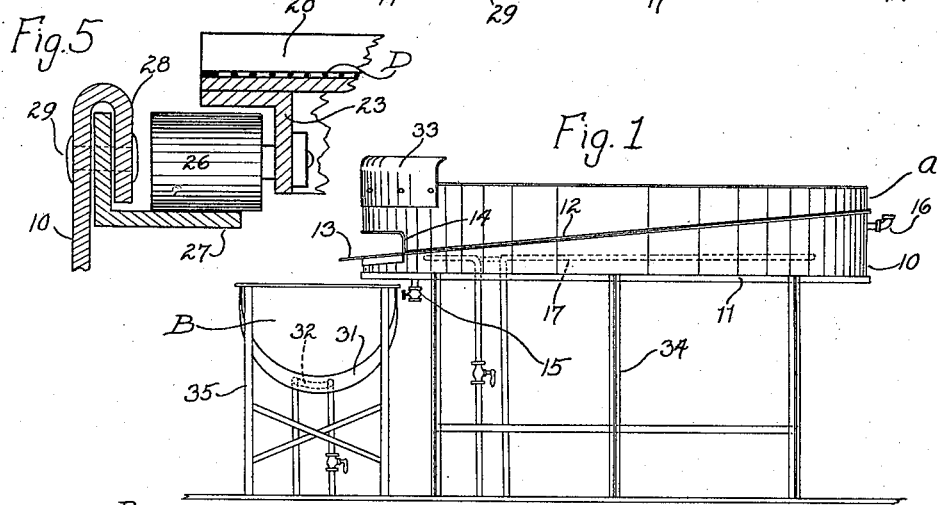
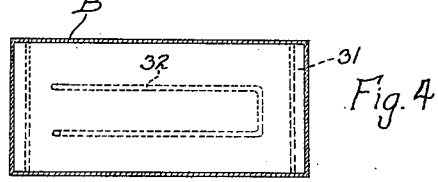
INVENTOR:
ANDREW S. CAIRNCROSS
BY: Bradbury & Caswell
ATTORNEY

UNITED STATES PATENT OFFICE.

ANDREW S. CAIRNCROSS, OF ST. PAUL, MINNESOTA.

ICING-MACHINE.

1,390,494.     Specification of Letters Patent.    Patented Sept. 13, 1921.

Application filed August 7, 1920. Serial No. 401,955.

*To all whom it may concern:*

Be it known that I, ANDREW S. CAIRNCROSS, a citizen of the United States, residing at St. Paul, in the county of Ramsey and State of Minnesota, have invented a new and useful Icing-Machine, of which the following is a specification.

My invention relates to icing machines of that class in which cakes and other pastry are coated with frosting. The primary object is to provide a machine of the class stated in which the operation of icing pastry is facilitated and in which the drip and surplus icing material is returned to a supply tank where it can be used, thereby reducing waste. A further object is to provide a simple and inexpensive machine of the kind stated by the use of which hand labor is reduced to a minimum and sanitation is benefited.

In the accompanying drawing forming part of this specification, Figure 1 is a side elevation of my invention; Fig. 2 is a plan of one half of the pastry icing table structure, one only of the pastry racks being shown; Fig. 3 is a central longitudinal vertical section of the table structure taken on the line 3—3 of Fig. 2; Fig. 4 is a plan of the icing receptacle, and Fig. 5 is an enlarged section taken on the line 5—5 of Fig. 2, showing the construction of a portion of the table structure.

My invention employs a rack or icing table structure A on which the cakes or other pastry to be frosted are placed, and an icing receptacle B in which the icing material in liquid condition to be used is placed and into which the surplus or waste icing material dripping from the cakes on the racks returns. The rack table consists of a vertically disposed cylindrical casing 10 closed at its lower end by the disk plate 11 and supporting a downwardly sloping floor 12 below the upper portion of the casing forming a drip pan for the icing. The structure thus forms a hot water tank by which the drip pan is heated so that the icing caught by the pan will not harden and will flow downwardly over a projecting lip 13 through the opening 14 in the casing and into the supply receptacle B. Water is fed into the tank by the valved supply duct 16 and may egress through the valved outlet 15. A steam coil 17 in the tank serves as one means by which to heat the water.

Arranged in the casing above the pan is a horizontally disposed revoluble rack frame C composed of three evenly distributed intersecting beam members 20, 21 and 22, mounted at their ends on a circular angle member 23 and braced by the transverse members 24 near the center of the frame. This structure has a depending pivot pin 25 at or near its center and a plurality of anti-friction rollers 26 journaled upon bearings which are carried by the ring 23, said rollers being mounted to travel freely upon the lower inwardly projecting side of a circular angle member 27. This angle member 27 is secured to the rim 28 of the casing by bending the rim tightly over the upper side of the angle member 27 and securing rivets 29 or other suitable means through the angle member 27 and the adjacent sides of the rim (see Fig. 5). The pivot 25 is journaled freely in a vertical sleeve 29 which is mounted at approximately the center of the casing to assist in guiding the carrier rollers concentrically within the casing. The rack frame C is thus free to turn within the casing. Segmental shaped trays D made out of wire grating or other open work material are placed in the open spaces of the rack frame. Cakes or other pastry articles are first immersed in the liquid icing in receptacle B and then placed on the trays D where they are allowed to drain until drip ceases, whereupon each tray loaded with iced pastry articles is removed from the rack frame to a drier. Bales 30 on the trays facilitate handling them. While the machine is being loaded with pastry articles or unloaded, the rack frame can be easily turned by hand to facilitate their operation by an attendant. The drip from icing the pastry articles upon the trays is caught by the sloping floor 12 and flows or passes back into the receptacle B, thus producing greater economy and sanitation. The receptacle B has a hot water chamber 31 for heating the icing material therein, the water in said chamber being heated by a coil 32. A guard 33 above the opening acts as an anti-splasher for the icing. The table structure is supported by the frame 34 and the supply receptacle is supported by the frame structure 35.

Having described my invention, what I claim as new and desire to secure by Letters Patent is:

1. An icing machine, comprising, in combination, a cylindrical casing having an opening in one side thereof, a bottom for said casing, a downwardly sloping floor therein, extending at its lower extremity through said opening, said casing, bottom and floor forming a chamber for a heating medium, a central support passing through the floor and secured at its lower end to said bottom, a frame revolubly centered on said support, an annulus within the casing having an upright flange turned inward at its lower edge to form a horizontal track member, the upper edge of said casing being turned downward over the flange and attached thereto to strengthen the upper margin of the casing and secure the annulus in place, antifriction elements between the frame and track member for supporting the outer margin of the latter and severally removable trays of open work material carried by said frame.

2. An icing machine, comprising, in combination a cylindrical casing having an opening in one side thereof, a bottom for said casing, a floor in said casing sloping downwardly toward said opening, said casing, bottom and floor forming a chamber for a heating medium, a central support in the casing, a frame revolubly centered on said support, an annulus within the casing having an upright flange turned inward at its lower edge to form a horizontal track member, the upper edge of said casing being turned downward over the flange and attached thereto to strengthen the upper margin of the casing and secure the annulus in place, antifriction elements between the frame and track member for supporting the outer margin of the latter and severally removable trays of open work material carried by said frame.

3. An icing machine, comprising, in combination, a cylindrical, sheet-metal casing having an opening in one side thereof, a sheet-metal bottom for said casing, a sheet-metal floor in said casing sloping downwardly toward said opening, said casing, bottom and floor forming a chamber for a heating medium, a central support passing through and braced by the floor and secured at its lower end upon said bottom, a frame revolubly centered on said support, a circular track within the casing adapted to stiffen the same, antifriction elements between the frame and track for supporting the outer margin of the latter and severally removable trays of open work material carried by said frame.

4. An icing machine, comprising, in combination, a cylindrical casing having an opening in one side thereof, a bottom for said casing, a floor in said casing sloping downwardly toward said opening, said casing, bottom and floor forming a chamber for a heating medium, a central support passing through the floor and secured at its lower end to said bottom, a frame revolubly centered on said support, a circular track within the casing, antifriction elements between the frame and track for supporting the outer margin of the latter and severally removable trays of open work material carried by said frame.

In testimony whereof I have signed my name to this specification.

ANDREW S. CAIRNCROSS.